United States Patent Office 3,487,574
Patented Jan. 6, 1970

3,487,574
EXPANSIBLE SLEEVE
Nils Oskar Tore Lööf, Gullspang, Sweden
Filed Dec. 18, 1964, Ser. No. 419,420
Claims priority, application Sweden, Dec. 23, 1963,
14,434/63
Int. Cl. G09f 3/00; F16l 55/00; H01b 7/36
U.S. Cl. 40—316                              10 Claims

ABSTRACT OF THE DISCLOSURE

A device for coding electrical cables and wires which includes a generally-annular sleeve made up of a main body portion and a laterally-expansible portion having one or more longitudinal, generally U-shaped loops with a converging neck where the loop joins the remainder of the sleeve. The sleeve is preferably extruded plastic which is then cut into appropriate lengths to serve as a marking device.

---

The present invention relates to an expansible sleeve and a method of manufacturing the same. In a still more specific aspect, the present invention relates to an expansible sleeve for marking electrical conductors and a method of manufacturing the same.

It has been the practice in the prior art to provide ring- or sleeve-type marking elements which may be placed on electrical conductors and the like to give an indication of the nature of the conductor, its origin, or its terminus. Such markers are generally made of an elastic material, such as, a synthetic plastic; and, in many cases, include an accordian- or bellows-shaped section which permits the use of sleeves of a given size on conductors having widely different diameters. Such sleeves are usually coded by applying identifying indicia, such as, letters or figures to the sleeve or making the sleeve of a distinctive color. In some cases the sleeve may be made of a distinctive color and also marked with appropriate indicia.

The manufacture of expansible sleeves of the type referred to above becomes a problem since one is faced with both problems of economics and mechanical manufacturing difficulties. The most economical method of manufacturing an expansible sleeve is by extrusion of a flowable material. However, expansible sleeves cannot be manufactured, with walls having substantially equal thicknesses throughout, by extrusion methods unless the wall thickness is made comparatively great. In addition, the flowable material utilized must be comparatively soft so that the sleeve will be flexible when finished, but when using such soft materials in an extrusion process the extruded material tends to flow or sag to a certain extent before it sets or hardens. This is particularly true in that portion of the sleeve which is expansible. For example, in order to make a sleeve comparatively soft, so that it will have adequate flexibility for mounting on a variety of sizes of electrical conductors or cables, a material such as polyvinyl chloride has been utilized with up to 30% of a plasticizer added. Obviously, this material will, under certain conditions of extrusion, tend to flow or sag before it has hardened. In order to overcome this difficulty, the wall thickness is normally made sufficiently great that no sagging occurs or the relative amount of flow or sagging is small. However, such thick-walled sleeves have a substantially reduced flexibility and are therefore greatly limited in use to a few sizes of cables. In addition, the provision of thick-walled sleeves obviously increases the cost of manufacture by utilizing substantially greater amounts of materials and by requiring a larger number of dies in order to make enough sizes of sleeves to cover a given range of cable sizes.

It is therefore an object of the present invention to provide an improved expansible sleeve.

Another object of the present invention is to provide an improved expansible sleeve having relatively thin walls.

A still further object of the present invention is to provide an improved expansible sleeve having a substantially improved degree of expansion.

Another and further object of the present invention is to provide an improved expansible sleeve having a laterally extending loop formed in one side of its wall.

Yet another object of the present invention is to provide an improved expansible sleeve of elastic plastic having a laterally extending loop formed in one side of its wall.

A further object of the present invention is to provide an improved method of manufacturing an expansible sleeve.

A further object of the present invention is to provide an improved method of manufacturing an expansible sleeve.

A further object of the present invention is to provide an improved method of manufacturing an expansible sleeve having relatively thin walls.

A further object of the present invention is to provide an improved method of manufacturing an expansible sleeve wherein a flowable material is extruded through a die having an annular main body configuration and a loop laterally extending from one side of the annular body.

Another object of the present invention is to provide an improved method of manufacturing an expansible sleeve wherein a flowable plastic material is extruded through a die having an annular main body configuration and a loop extending laterally from one side of the annular body.

These and other objects and advantages of the present invention will be apparent from the following detailed description wherein.

Figure 1:
FIGURE 1 is a cross-sectional view of an expansible sleeve manufactured in accordance with prior art techniques.

In accordance with FIGURE 1, a generally annular main body portion 1 is formed. Extending laterally from one side of the main body 1 is a folded or expansible portion 2. It is to be noted, in the prior art device of FIGURE 1, that the expansible portion 2 is generally V-shaped with the top of the V connected to the annular wall 1 of the sleeve. It should be clearly recognized, in this particular configuration, that the broadest part of the V or the top of the V is connected to the annular body portion 1 and the narrowest portion of the V forms the main body of the expansible portion 2. In addition, it is also to be noted that the thickness of the walls of the prior art device vary considerably because of the tendency of the flowable material from which the sleeve is made to flow or sag before it has time to set or harden. It is obvious that the tendency to sag would be greatly increased and the walls would have to be made even thicker if expansible portion 2 were made with a plurality of V's, as is common practice when the sleeve is made for use on comparatively thick conductors.

Figure 2:
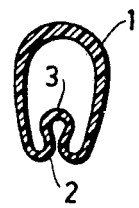
FIGURE 2 is a cross-sectional view of an expansible sleeve manufactured in accordance with one embodiment of the present invention.

In accordance with the present invention, an expansible sleeve is made by extruding a flowable material through a suitably-shaped die to produce an extrusion having the cross-sectional configuration shown in FIGURE 2 of the drawings, and cutting the extrusion into sleeves of predetermined length. Specifically, the sleeve of FIGURE 2 is made up of an annular main body portion 1 and a folded or expansible portion 2. Expansible portion 2, as shown in FIGURE 2, comprises a laterally extending loop 3 which extends from one side of the wall of annular portion 1. It should be clearly noted, particularly by comparison with FIGURE 1 which shows a prior art device, that the loop 3 of FIGURE 2 has a main body section whose cross-sectional dimension is greater than the cross-sectional dimension of the neck portion section which is connected to the main body portion 1. It is this loop configuration where the main body section of the loop is larger than the neck section, connecting the loop to the main annular body of the sleeve, which is the contributing factor to the improved method of manufacture of the present invention and the improved qualities of the expansible sleeve of the present invention. This particular loop configuration, as opposed to the V configuration of the prior art, shows surprising advantages over the prior art. It has been found that the loop configuration of the expansible portion of the sleeve permits one to make the wall thickness of the sleeve considerably less than has heretofore been the practice of the prior art and there will be no tendency to flow or sag when the sleeve is extruded in accordance with the preferred method of the present invention. This ability to extrude a thinner-walled sleeve has also been found to greatly increase the flexibility of the sleeve and permit its use on cables having a wider range of sizes. The particular configuration of a loop, as opposed to a V, itself contributes to the improved expansibility of the sleeve. As a matter of fact, the combination of the thinner wall structure and the loop-type expansible portion has been found to make possible the use of the sleeve on cables whose diameters cover a range as much as 50% greater than the range which can be covered by sleeves of the prior art.

Figure 3:
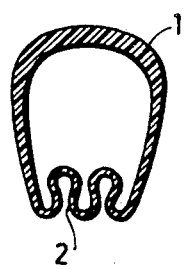
FIGURE 3 is a cross-sectional view of an expansible sleeve manufactured in accordance with a second embodiment of the present invention.

FIGURE 3 shows a second embodiment of the expansible sleeve of the present invention in which two loops 3 are utilized to make up the expansible portion 2 of a sleeve having an annular main body portion 1. It is quite obvious that the plurality of loops which form expansible portion 2 of the sleeve of FIGURE 3 will permit the sleeve to be used on an even larger number of different sizes of cable.

Figure 4:
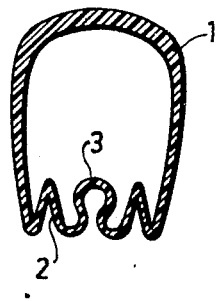
FIGURE 4 is a cross-sectional view of an expansible sleeve manufactured in accordance with a third embodiment of the present invention.

FIGURE 4 of the drawings illustrates still another embodiment of the present invention in which a single loop 3 is combined with one or more V-shaped extensions to make up expansible portion 2. While this is a less desirable configuration, it has been found that a single loop 3 is often sufficient to attain the advantages of expansibility of the sleeve of the present invention.

Where the term "flowable material" is referred to herein, this term is meant to include any material which can be extruded, either hot or cold, through an appropriate die to form an extrusion whose configuration corresponds to the die openings. Accordingly, any flowable plastic, such as, polyvinyl chloride, which is thermosetting may be utilized. It should also be recognized that this term can include a variety of other materials, such as aluminum, which will produce a hard but flexible or elastic thin-walled sleeve.

Where the term "sleeve" is used in the present application, this term is meant to include any configuration of generally annular form which can be placed about an object, such as an electrical cable or the like. Obviously, the sleeve can include any configuration adapted to the object upon which the sleeve is to be placed. It may be generally square, generally oval in shape, or generally rounded, as shown. In addition, it is to be recognized that the term "sleeve" is not meant to limit the axial length of the element. The element may therefore be relatively short in axial length and therefore be, in essence, a ring, or it may be long in axial length and therefore be an elongated sleeve.

The term "loop" as used in the present application is meant to include any of the various configurations in which the main body section of the loop is of greater dimension than the neck section and the neck section is that portion connecting the loop to the main sleeve. This, as previously pointed out, contrasts to a V-shaped configuration in which the broadest part of the V connects with the main body of the sleeve. It is, of course, quite obvious that the loop may have a variety of cross-sectional configurations also without departing from this definition. Specifically, the loop may be rounded, as shown, rectangular, oval-shaped, square, diamond-shaped, or any other suitable configuration, provided, as previously indicated, that the neck section is narrower than the main body section.

Various other modifications and variations of the present invention will, of course, be obvious to one skilled in the art. For example, loops need not be extended from one side of the expansible sleeve but can be placed on two opposing sides of the main sleeve body or on four opposing sides. It is also to be recognized that, while the drawings and description generally consider that the loops 3 extend inwardly, inside the main annular body of the sleeve, whether the loops extend inside or outside the sleeve is primarily a matter of viewpoint since, for example, in FIGURE 2 the sleeve can be said to have a single inward loop or two outward loops. Accordingly, the present invention is to be limited only by the appended claims.

I claim:

1. A marking device for electrical cables and wires, comprising: a main body portion and a laterally expansible portion combined to form a closed, generally-annular sleeve, said expansible portion including, at least one longitudinally disposed, generally U-shaped loop having a converging neck at the juncture of said loop with the remainder of said sleeve.

2. A sleeve in accordance with claim 1 wherein the sleeve is formed of an elastic material.

3. A sleeve in accordance with claim 1 wherein the sleeve is formed of a thermoset material.

4. A sleeve in accordance with claim 1 wherein the sleeve is formed of a plastic material.

5. A sleeve in accordance with claim 1 wherein the sleeve is formed of a polyvinyl chloride resin.

6. A sleeve in accordance with claim 1 wherein the loop is disposed inside the main body portion.

7. A sleeve in accordance with claim 1 wherein the expansible portion includes a plurality of loops in side-by-side relation.

8. A sleeve in accordance with claim 1 wherein the expansible portion includes at least one loop and at least one V-shaped extension extending laterally from the side of the main body portion.

9. A sleeve in accordance with claim 8 wherein the loop is disposed between two V-shaped extensions.

10. A sleeve in accordance with claim 1 which carries identifying indicia.

References Cited

UNITED STATES PATENTS

| 71,222 | 12/1875 | Rohrman | 138—28 |
| 1,474,011 | 11/1923 | Allyn | 138—121 |
| 1,989,914 | 2/1935 | Chase | 138—28 |
| 2,157,564 | 5/1937 | Peuthert | 138—121 |
| 1,095,100 | 4/1914 | Fulton | 138—121 |
| 2,823,702 | 2/1958 | November | 138—121 |
| 3,201,111 | 8/1965 | Afton | 138—121 XR |

HERBERT F. ROSS, Primary Examiner

U.S. Cl. X.R.

138—104, 119, 121; 174—112; 40—23